United States Patent Office 3,829,452
Patented Aug. 13, 1974

3,829,452
ANTHRAQUINONE DYESTUFFS
Klaus Wunderlich, Leverkusen, and Hans-Samuel Bien, Burscheid, Germany, assignors to Bayer Aktiengesellschaft, Leverkusen, Germany
No Drawing. Filed Feb. 20, 1969, Ser. No. 801,147
Claims priority, application Germany, Feb. 29, 1968, P 16 44 626.7
Int. Cl. C09b 1/30, 1/34
U.S. Cl. 260—372         12 Claims

ABSTRACT OF THE DISCLOSURE 5-sulfo-1-isopropylamino, 4-substituted-amino anthraquinone dyestuffs are provided having very good fastness properties when applied to synthetic and natural polyamide fiber materials.

The invention relates to valuable new dyestuffs of the formula

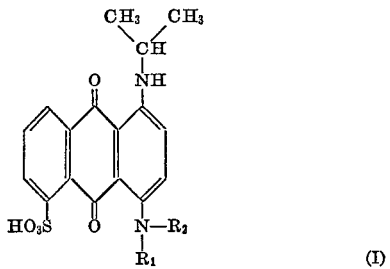

In this formula $R_1$ represents an aromatic, aliphatic, araliphatic or cycloaliphatic radical, $R_2$ means hydrogen or an aliphatic radical.

In a preferred class of new compounds of the formula (I) $R_2$ stands for hydrogen, and $R_1$ for a mono- or bicyclic aromatic carbocyclic radical, in particular, a radical of the benzene series. The radical $R_1$ may contain further substituents, such as alkyl radicals preferably containing up to 12 carbon atoms, cycloalkyl radicals, preferably cyclohexyl radicals; phenoxy radicals; alkoxy radicals, preferably lower alkoxy radicals; alkylmercapto radicals, preferably lower alkylmercapto radicals or arylmercapto radicals; alkylsulphonyl radicals, preferably lower alkylsulphonyl radicals, or arylsulphonyl radicals; halogen, such as Cl, Br or F; sulphonic acid, sulphonic acid amide or sulphonic acid ester radicals; carboxylic acid, carboxylic acid amide, carboxylic acid ester groups; nitrile groups or amino groups which may be substituted, for example, by alkyl, acyl or cycloalkyl radicals. The radical $R_1$ may contain one or more substituents of this type. The hydrocarbon radicals of the afore-mentioned substituents may themselves be further substituted, for example, by halogen, such as chlorine, bromine or fluorine, or by alkyl radicals, preferably lower alkyl radicals, or by sulphonic acid, hydroxy or nitrile groups. The aliphatic radical $R_2$ may also contain further substituents, such as OH, CN, lower alkoxy radicals, F, Cl, Br, sulphato or aryl radicals.

The new dyestuffs are obtained by reacting 1-iso-propylamino-4-bromo-anthraquinone-5-sulphonic acid or the salts thereof with aromatic, (ar)aliphatic or cycloaliphatic amines.

The 1-iso-propylamino-4-bromo-anthraquinone-5 - sulphonic acid to be used as starting material is obtained by brominating 1-iso-propylamino-anthraquinone-5-sulphonic acid.

Examples of suitable aromatic amines are the following, inter alia: aniline, α-naphthylamine, o-, m-, p-toluidine, 2,6-dimethylaniline, 2,4,6-trimethylaniline, 2-methyl-6-ethyl-aniline, 2,4-dimethyl-6-ethyl-aniline, 2,6-diethyl-4-methyl-aniline, p-tert.-butylaniline, p-dodecylaniline, p-cyclohexylaniline, o-chloro-aniline, m-chloro-aniline, p-chloro-aniline, m-bromo-aniline, p-fluoro-aniline, 3-chloro-4-methylaniline, m-aminobenzene-sulphonic acid, m-aminobenzonitrile, o-anisidine, m-anisidine, p-anisidine, 3-ethoxy-aniline, 2-[β-hydroxy]-ethoxy-aniline, 3 - [β - hydroxy]-ethoxy-aniline, 4-[β-hydroxy]-ethoxy-aniline, 4-[β-cyano]-ethoxy-aniline, 4-methoxy-3 - chloro - aniline, 2-methyl-4-methoxy - aniline, 2,5 - diethoxy - aniline, [4-amino] - benzylmethylamine, 4 - aminobenzodioxane, 4-amino-phenyl-β-[N,N-diethylamino]-ethyl ether, aminohydroquinone-dimethyl ether, [(o-, m-, p-)-amino]-N,N-dimethyl-benzylamine, 4-amino-diphenyl ether: (o-, m-, p-)-thioanisidine, 4-amino-diphenyl-thio ether, 3-[β-hydroxyethyl]-sulphonyl-aniline, 3-phenyl-sulphonyl-aniline, m-phenylene-diamine, p-phenylene-diamine, m-phenylene-diamine-6-sulphonic acid, 4,4'-diaminostilbene-disulphonic acid-(1,1'), N,N-di-[β-cyano]-ethyl-p-phenylene-diamine, 6-methyl-m-phenylene-diamine-4-sulphonic acid; 3-aminoacetanilide, 4-amino-acetanilide, N-methyl-N-acetyl-p-phenylene-diamine, N-cyclohexyl-N-acetyl-p - phenylene-diamine, benzoic acid-[4-amino]-anilide, N-ethyl-N-benzoyl-p-phenylene-diamine, glycollic acid-[4-amino]-anilide, glycollic acid-[3-amino]-anilide, 3-acetylamino-4-methylaniline, N-[4-amino]-phenyl-pyrrolidone; glycollic acid-[4-amino]-phenyl ester, 3-amino-benzene-sulphonic acid phenyl ester.

Anthranilic acid, 4 - acetylamino-anthranilic acid, 3-amino-benzoic acid, 4-amino-benzoic acid methyl ester, 3-amino-4-methyl-benzoic acid, p-acetylaniline, 2-aminobenzoic acid methyl, ester, 3-amino-benzoic acid methyl ester; 3-amino-4-methoxy-benzene-sulphonic acid diethylamide, 3-aminobenzene-sulphonic acid-N-[β-hydroxy]-ethyl-N-[β-cyano]-ethylamide, 4-amino-benzene-sulphonic acid-di-[β-cyano]-ethylamide, 3-aminobenzene-sulphonic acid-N-[β-cyano]-ethyl-N-[β - acetoxy] - ethylamide, 3-amino-benzene-sulphonic acid-di-[β-hydroxy]-ethylamide.

Examples of suitable cycloaliphatic amines are the following inter alia: cyclohexylamine, hexahydro-p-phenylene-diamine, N-acetyl-hexahydro-p - phenylene - diamine, hexahydro-p-toluidine.

Suitable aliphatic amines are, for example: methylamine, ethylamine, n-propylamine, iso-propylamine, n-butylamine, iso-butylamine, β-hydroxy-ethylamine, 3-amino-pentane, 3-methoxy-propylamine.

Examples of suitable araliphatic amines are the following inter alia: benzylamine, 1-phenyl-2-amino-ethane, 1-phenyl-3-amino-butane, 1-phenyl-2-amino-propane.

The production of the new dyestuffs can be carried out in an aqueous medium, optionally in the presence of copper or copper salts serving as catalysts. The resultant products can subsequently be halogenated, e.g. with chlorine or bromine, or with the customary agents splitting off halogen.

If the aromatic or (cyclo)aliphatic amine used for the reaction contains a further primary or secondary amino group, then the products obtained according to the present process can subsequently be acylated. Acylating agents used for this purpose are, inter alia: benzoyl chlorides substituted by lower alkyl, lower alkoxy or halogen groups; sulphochlorides, such as p-toluene-, benzene- or α-naphthyl-sulphochloride; furthermore chloroformic acid phenyl or alkyl esters. In the two last-mentioned cases, urethanes are obtained which can be converted into urea derivatives by a further reaction with lower aliphatic amines, such as hydroxyethylamine or 3-methoxypropylamine.

The products obtained according to the present process may subsequently also be sulphonated. By converting the resultant sulphonic acids into sulphochlorides, e.g. by means of thionyl chloride and subsequent reaction with lower, optionally substituted aliphatic amines, such as β-hydroxyethylamine, diethanolamine, 3-methoxy-propylamine, those dyestuffs of the formula (I) can be obtained which contain sulphonamide groups.

The new dyestuffs are valuable products which are eminently suitable for the dyeing and printing of natural and synthetic polyamide fibre materials, such as wool, silk and synthetic polyamide fibres on which dyeings with very good fastness properties are obtained.

From Belgian Patent Specification No. 695,323 dyestuffs are already known which are obtained by the reaction of 1 - cyclohexylamino - 4 - bromo - anthraquinone-5-sulphonic acid with aromatic or cycloaliphatic amines. The new dyestuffs of the formula (I) containing an isopropylamino group in the 1-position are distinguished, in comparison with the known dyestuffs, by a markedly improved solubility, light fastness and a better levelling power on wool.

The parts mentioned in the following Examples are parts by weight if not otherwise stated. The temperatures are given in degree centigrade.

Example 1

20 Parts sodium 1-iso-propylamino - 4 - bromo-anthraquinone - 5 - sulphonate are heated at 70° C. together wth 20 parts p-aminoacetanilide, 30 parts sodium hydrogen carbonate and catalytic amounts of copper(I) chloride in 300 parts of water until starting material is no longer detected by chromatography. The product is filtered off with suction while cold, and washed with a 2% sodium chloride solution until neutral. The moist filter cake is stirred cold into 500 parts 2% hydrochloric acid, filtered off with suction after brief stirring, and washed with a 2% sodium chloride solution. The filter cake is again introduced into 500 parts of water and the pH value adjusted to 8–9 with sodium carbonate. After brief heating, the product is filtered off with suction when cold, washed with a 2% sodium chloride solution, and the resultant dyestuff which, in the form of the free acid, corresponds to the formula

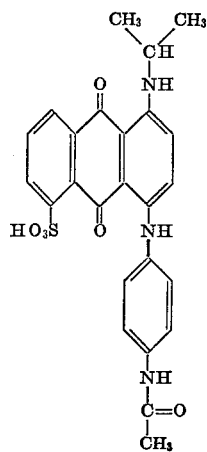

is dried.

Instead of sodium carbonate, it is also possible to neutralise with other bases, such as ammonia, β-hydroxyethylamine, bis-(β - hydroxy-ethyl)-amine, di-(β-hydroxypropyl)amine or methylamine.

(a) 10 Parts of wool are dyed in usual manner on the hank dyeing apparatus with 0.2 part of the above dyestuff in the form of its sodium salt with the addition of 3% formic acid and 8% sodium sulphate (calc.). A green light-fast dyeing of good levelness and good fastness to washing is thus obtained.

(b) 10 Parts of wool are dyed with 0.2 part of the dyestuff of this Example in the form of the β-hydroxyethylamine salt with the addition of 4% sulphuric acid and 8% sodium sulphate (calc.); the wool is introduced at about 60° into a bath which is heated to boiling temperature within about 30 minutes and, dependent upon the material, it is heated at the boil for one to 1½ hours. The dyeing corresponds with regard to all its properties to that of Example 1(a).

(c) 15 Parts of a synthetic superpolyamide fibre material are dyed at near boiling temperature with 0.6 part of the dyestuff of this Example with the addition of 10% Glauber's salt and 5% acetic acid. A green dyeing of good levelness and very good fastness to light is thus obtained.

(d) 20 Parts of natural silk are dyed at 100° with 0.1 part of the dyestuff of this Example in the form of the hydroxyethylamine salt with the addition of 10% Glauber's salt and 4% formic acid. A green dyeing of good general fastness properties is obtained.

Example 2

A suspension of 10 parts sodium 1-iso-propylamino-4-bromoanthraquinone - 5 - sulphonate, 10 parts m-aminoacetanilide-hydrochloride and 10 parts water is adjusted to a pH value of 6 by the addition of a sodium hydroxide solution. 15 Parts sodium hydrogen carbonate and catalytic amounts of copper(I) chloride are added and the mixture is heated to 90°. When the starting material is used up, the product is filtered off with suction while cold and thoroughly washed with a 2% sodium chloride solution. When cold, the filter cake is stirred into 250 parts 5% hydrochloric acid, after brief stirring, the product is filtered off with suction and the filter cake introduced into 250 parts of water. The mixture is heated to about 80° and simultaneously adjusted to a pH value of 8 by means of sodium carbonate. After cooling, the dyestuff which corresponds, in the form of the free acid, to the formula

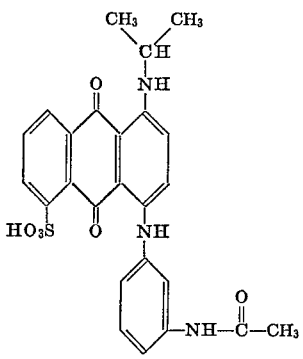

is filtered off with suction, washed with a 2% sodium chloride solution and dried. Blue-green dyeings of good fastness to washing are obtained on wool and synthetic superpolyamide fibres.

Example 3

10 Parts of sodium 1 - iso - propylamino - 4 - bromo-anthraquinone - 5 - sulphonate are heated to 70° with 10 parts glycollic acid-[4'-amino]-anilide, 15 parts sodium bicarbonate and catalytic amounts of copper(I) chloride in 100 parts of water. The starting material has disappeared after about 5 hours. The product is filtered off with suction when cold, washed with a 5% sodium chloride solution and the dyestuff is purified as described in Example 2. Very level, bluish green dyeings are obtained on wool and synthetic superpolyamide fibres.

Example 4

10 Parts sodium 1-iso-propylamine-4-bromo-anthraquinone-5-sulphonate are heated to 80° in 150 parts water and 30 parts ethyl alcohol together with 6.2 parts aniline, 15 parts sodium hydrogen carbonate and 0.5 part finely divided copper (I) chloride until only traces of the starting material can be detected by chromatography. When cold, the product is filtered off with suction and washed several times with a mixture of 150 parts water and 30 parts ethyl alcohol. The moist filter cake is stirred into 250 parts 5% hydrochloric acid, filtered off with suction after brief stirring, and the residue is stirred into 250 parts of water while maintaining a pH of 8 (by the simultaneous addition of sodium hydrogen carbonate). The dyestuff

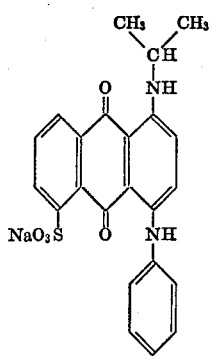

is washed three-times with water and dried. Very level blue dyeings with very good fastness to light and good fastness to washing are obtained on synthetic superpolyamide fibres.

10 Parts of wool are dyed with 0.2 part of the dyestuff of this Example in the form of its finely dispersed sodium salt with the addition of 3% acetic acid and 8% sodium sulphate (calc.); the wool is introduced at 40–50° into a bath brought to boiling within 30 minutes, and boiled for 45–90 minutes. A green-blue dyeing of good levelness and very good fastness to washing and good fastness to light is thus obtained.

Example 5

10 Parts sodium 1-iso-propylamino-4-bromo-anthraquinone-5-sulphate, 6.0 parts p-anisidine, 5.2 parts sodium carbonate and 250 parts water are heated at 90° in the presence of catalytic amounts of copper(I) chloride until starting material can no longer be detected by chromatography. When cold, the product is filtered off with suction and the dyestuff obtained

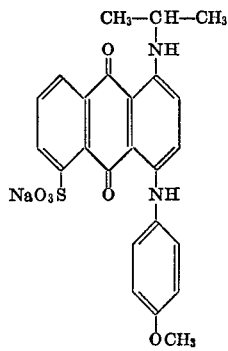

is purified as described in Example 1. Level blue-green dyeings with good fastness to washing and light are obtained on wool and synthetic superpolyamide fibres.

Example 6

10 Parts sodium 1-iso-propylamino-4-bromo-anthraquinone-5-sulphonate, 6.6 parts cyclohexylamine, 9.5 parts sodium carbonate, 150 parts water and 30 parts ethyl alcohol are heated at 80° in the presence of catalytic amounts of copper(I) chloride until starting material can no longer be detected by chromatography. The product is filtered off with suction when cold and washed several times with a mixture of 150 parts water and 30 parts alcohol. The moist filter cake is stirred into 250 parts of water 2% hydrochloric acid. After brief stirring, the product is filtered off with suction and washed with water. The moist filter cake is stirred into 250 parts of water and the pH value adjusted to 8 by means of sodium carbonate. After heating at 80° for a short period of time, the dyestuff is salted out with 5 parts sodium chloride and the dyestuff

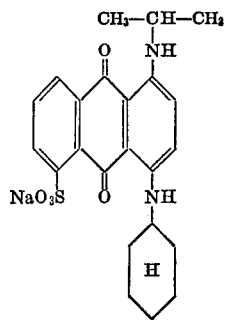

is filtered off when cold, washed with a 2% sodium chloride solution and dried. Brilliant blue dyeings of good fastness to washing are obtained on wool.

Example 7

10 Parts sodium 1 - iso - propylamino-4-bromo-anthraquinone-5-sulphonate, 5.3 parts 4-amino-phenyl-β-hydroxy-ethyl ether. 10.6 parts sodium carbonate and catalytic amounts copper(I) chloride are heated in 100 parts methanol and 400 parts water first at 70° for 4 hours and finally at 90° for 12 hours. The reaction product is filtered off with suction when cold, washed several times with water and purified according to the method described in Example 6. The resultant dyestuff

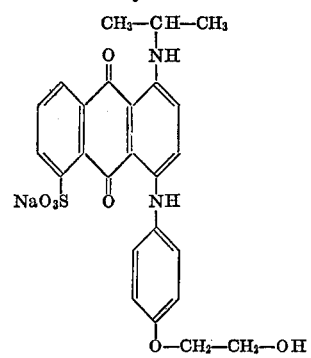

yields level blue-green dyeings of good fastness properties on wool and synthetc superpolyamide fibres.

Example 8

10 Parts 1 - iso - propylamino-4-(4'-β-hydroxy-ethoxyphenylamino) - anthraquinone - 5 - sulphonic acid obtained according to Example 7 are suspended in 100 parts pyridine and heated at 60° for 3 hours with 4.0 parts chlorosulphonic acid. The reaction mixture is poured into 300 parts of a 10% sodium chloride solution. The resultant dyestuff

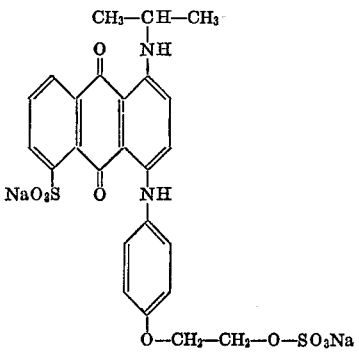

is salted out with sodium chloride. It is filtered off with sucton, washed with a 15% sodium chloride solution and dried at 50° in a vacuum. The dyestuff dyes wool and synthetic superpolyamide fibres in blue-green shades of good general fastness properties.

Example 9

20 Parts sodium 1-iso-propylamino-4-bromo-anthraquinone-5-sulphonate, 25 parts 2,6-diamino-1-methylbenzene-4-sulphonic acid (Na salt), 30 parts sodium hydrogen carbonate and 300 parts water are heated at 60° together with catalytic amounts of copper(I) chloride until starting material can no longer be detected by chromatography. After the addition of 100 parts sodium chloride, the product is filtered off with suction when cold and washed with a 15% sodium chloride solution until the runnings are colourless. The moist filter cake is stirred into 600 parts 2% hydrochloric acid. After brief stirring, 50 parts sodium chloride are admixed followed by suction-filtration and washing with a 15% sodium chloride solution. The moist filter cake is heated to 60° together with 30 parts sodium hydrogen carbonate in 500 parts of water. The resultant dyestuff

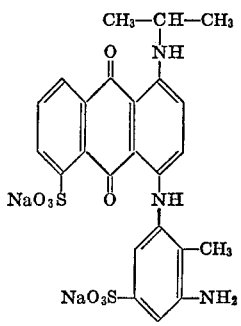

is salted out with sodium chloride, filtered off with suction when cold, washed with a 20% sodium chloride solution and dried. The dyestuff dyes wool and synthetic superpolyamide fibres in blue shades of good fastness to wet processing.

Example 10

20 Parts sodium 1-iso-propylamino-4-bromo-anthraquinone-5-sulphonate, 20 parts 2,5-diamino-benzene-sulphonic acid (Na salt), 30 parts sodium hydrogen carbonate and 300 parts water are heated to 55° together with catalytic amounts of copper(I) chloride until starting material can no longer be detected by chromatography. When cold the product is filtered off with suction and washed with a 5% sodium chloride solution until the runnings are clear. The moist residue is stirred into 600 parts 2% hydrochloric acid. After stirring for a short time, 50 parts sodium chloride are admixed, followed by suction-filtration and washing with a 10% sodium chloride solution. The moist filter cake is dissolved at 50–60° in 700 parts of water while adjusting a pH value of 8 by means of a dilute sodium hydroxide solution. After the addition of 5 g. powdered active charcoal, the solution is filtered and the dyestuff

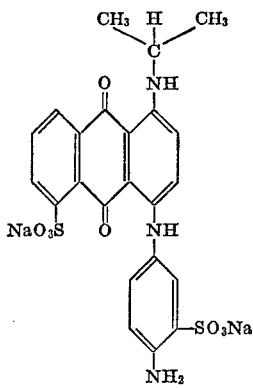

is salted out from the filtrate with sodium chloride. It is filtered off with suction, washed with a 10% sodium chloride solution and dried. The dyestuff dyes wool and synthetic superpolyamide fibres in blue-green shades of good fastness to wet processing.

Example 11

46.2 Parts 1-iso-propylamino-4-bromo-anthraquinone-5-sulphonic acid (potassium salt) are heated at 80° C. for 3–4 hours, while stirring, together with 26.4 parts p-toluidine, 25 parts sodium hydrogen carbonate and catalytic amounts of copper(I) chloride in 400 parts of water and 100 parts of ethyl alcohol. The reaction mixture is filtered off with suction while hot, washed first with 500 parts of an ethyl alcohol/water mixture (1:4) and then with water until the runnings are almost colourless. The moist residue is stirred into 1,000 parts of water and mixed with 120 parts concentrated hydrochloric acid. After stirring for 30 minutes, the mixture is filtered off with suction, washed with 2N hydrochloric acid and with water. The moist filter cake is stirred into 200 parts of water and adjusted to a pH value of 9.0 with β-hydroxyethylamine. The solution is evaporated to dryness at 40–50° C. in a vacuum, and the resultant dyestuff of the formula

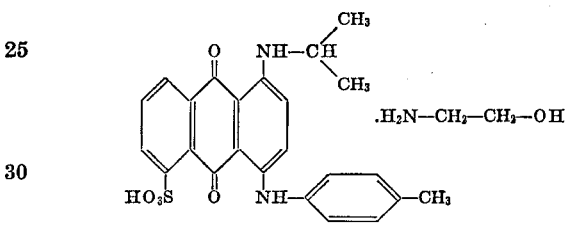

is further dried at 80° in a vacuum. Greenish blue dyeings of good fastness properties are obtained on wool.

When neutralisation is carried out, instead of with β-hydroxy-ethylamine, with sodium hydrogen carbonate until a pH value of 7.5 is obtained, then there is obtained, after suction-filtration, washing and drying, the dyestuff in the form of its sodium salt.

Example 12

15 Parts of the sodium salt of the dyestuff obtainable according to paragraph 2 of Example 11 and corresponding to the formula

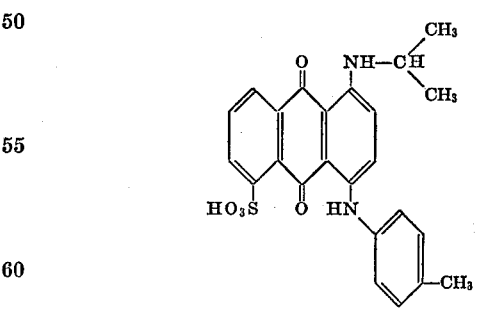

are dissolved in 270 parts 5% oleum at 0–5° C., while stirring.

A further 45 parts 20% oleum are subsequently added after 3 hours. This solution is stirred, after stirring for 5 hours at 0–5° C., into a mixture of 500 parts of ice and 500 parts of a saturated common salt solution, the precipitated dyestuff is filtered off with suction and washed with a saturated sodium chloride solution. The moist filter cake is stirred into 200 parts of water and the solution adjusted to pH 7.5 with sodium hydrogen carbonate. After the addition of 35 g. sodium chloride, the dyestuff which, in the form of the free acid, corresponds to the formula

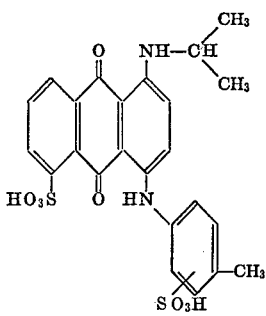

is filtered off with suction, washed with a 10% sodium chloride solution and dried at 60° C.

Greenish blue dyeings of good fastness properties are obtained on wool.

Example 13

46.2 Parts 1-iso-propylamino-4-bromo-anthraquinone-5-sulphonic acid (potassium salt) are heated at 80° C. for 4 hours together with 32.8 parts 4-amino-1-(N-methyl-N-acetyl)-amino-benzene, 50 parts sodium hydrogen carbonate and catalytic amount of copper(I) chloride in 500 parts of water. After cooling, the mixture is filtered off with suction and the residue washed with a 10% sodium chloride solution.

The moist residue is stirred into 500 parts of water and mixed with 120 parts of concentrated hydrochloric acid. After stirring for 30 minutes, the mixture is filtered off with suction and washed with 2N hydrochloric acid. The filter cake is then stirred into 500 parts of water and the solution adjusted to pH 7.5 with sodium carbonate. The dyestuff which, in the form of the free acid, corresponds to the formula

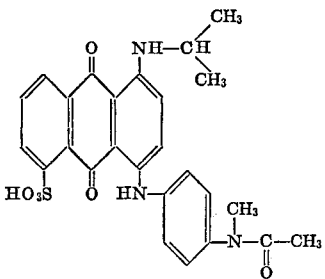

is precipitated by the addition of 50 parts sodium chloride, filtered off with suction after stirring for several hours, washed with a 5% sodium chloride solution and dried at 60° C.

Greenish blue dyeings of good fastness properties are obtained on wool and synthetic superpolyamides.

A dyestuff which, in the form of the free acid, corresponds to the formula

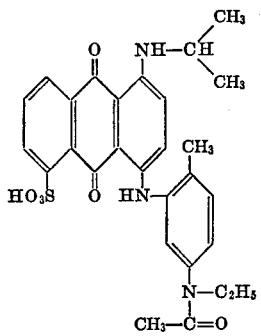

is obtained when there are used in the preceding Example, instead of 32.8 parts 1-amino-1-(N-methyl-N-acetyl)-aminobenzene, 47.6 parts 4-(N-ethyl-N-acetyl)-amino-2-amino-1-methyl-benzene.

Blue dyeings of good general fastness properties are obtained on wool and synthetic superpolyamides.

Example 14

46.2 g. 1 - iso-propylamino-4-bromo-anthraquinone-5-sulphonic acid (potassium salt) are heated at 80° C. for 4 hours, while stirring, with 38 parts 4-amino-benzylsulphonic acid, 50 g. sodium hydrogen carbonate and catalytic amounts of copper(I) chloride in 500 parts of water. After cooling, the solution is filtered off with suction, washed twice with a small quantity of water and subsequently with a 5% sodium chloride solution. The moist filter cake is dissolved in 1,000 parts of water, mixed with 90 parts concentrated hydrochloric acid and the product salted out with 150 parts sodium chloride. It is filtered off with suction and washed with 2N hydrochloric acid. The residue is stirred in 1,000 parts of water and the solution adjusted to pH 7.8 with sodium carbonate. After the addition of 5 parts active charcoal, the solution is filtered off with suction and the filtrate mixed with 50 g. sodium chloride. The precipitated blue dyestuff which, in the form of the free acid, corresponds to the formula

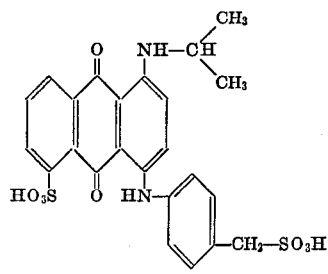

is filtered off with suction, washed with a 5% sodium chloride solution and dried at 60° C.

Greenish blue dyeings of good fastness properties are obtained on wool.

Example 15

10 Parts 1-iso-propylamino-4-bromo-anthraquinone-5-sulphonic acid (potassium salt) are heated to boiling, while stirring, in 150 parts of water and 100 parts ethyl alcohol with 8.8 parts 1-amino-4-methyl-2,6-diethyl-benzene, 7.5 parts sodium hydrogen carbonate and catalytic amounts of copper(I) bromide. The reaction mixture is acidified with concentrated hydrochloric acid after about 10 hours, and the precipitated blue dyestuff filtered off with suction and washed with water. The moist filter cake is dissolved in about 400 parts dimethyl formamide, the resultant solution filtered, and the dyestuff again precipitated by the dropwise addition of 1% hydrochloric acid. It is filtered off with suction and washed with dilute hydrochloric acid and water. The moist filter cake is introduced into 150 ml. of water and the pH value of this suspension adjusted to 9.5 with β-hydroxy-ethylamine. The resultant deep blue solution is evaporated to dryness at 60° C. in a vacuum, and the resultant dyestuff which corresponds to the formula

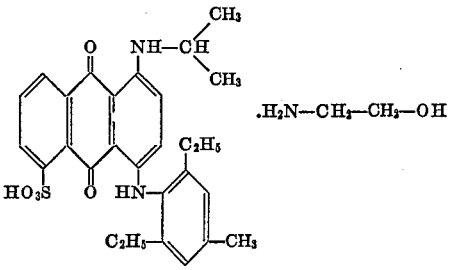

is dried in a vacuum at 100° C.

Very clear greenish blue dyeings are obtained on wool.

Example 16

23.1 Parts 1 - isopropylamino-4-bromo-anthraquinone-5-sulphonic acid (potassium salt) are heated at 80° C. for 4 hours with 14 parts isopropylamine, 6 parts sodium hydroxide solution (45%) and catalytic amounts of copper(I) chloride in 250 parts of water. After cooling to 40° C., the solution is filtered off with suction and washed with water. The filter cake is stirred in 1000 parts of water and heated with 100 parts glycolmonomethylether and 10 parts active charcoal. The solution is filtered off with suction and the filtrate mixed with 100 parts sodium chloride. The precipitated blue dyestuff which, in the form of the free acid, corresponds to the formula

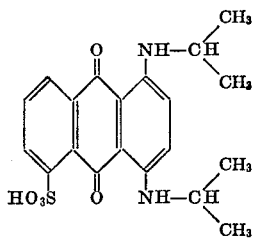

is filtered off with suction and dried at 60° C. Very clear blue dyings are obtained on wool.

What is claimed is:

1. An anthraquinone dyestuff having the formula

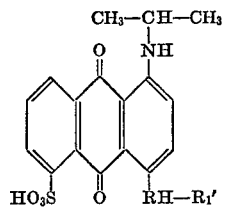

wherein said member $R_1'$ is selected from the group consisting of phenyl, substituted phenyl containing one or more substituents selected from the class consisting of methyl; ethyl; butyl; dodecyl; cyclohexyl, phenoxy, methoxy; ethoxy; β-hydroxy ethoxy; β-cyanoethoxy; methylmercapto; phenylmercapto; β-hydroxy ethylsulfonyl; phenylsulfonyl; chloro; bromo; fluoro; sulfonic acid; N,N-diethyl sulfonamido; N-hydroxy ethyl, N-cyanoethyl sulfonamido; N,N - dicyanoethylsulfonamido; N - cyano ethyl, N-acetoxy ethylsulfonamido; N,N-dihydroxy ethylsulfonamido; sulfonic acid phenyl ester; carboxy; cyano; amino; N,N-dicyano ethylamino; N-ethyl, N-acetyl-amino; N-methyl, N-acetylamino; N-ethyl - N - benzoylamino; acetylamino; benzylamino; hydroxy acetylamino; and N-cyclohexyl, N-acetylamino.

2. An anthraquinone dyestuff having the formula

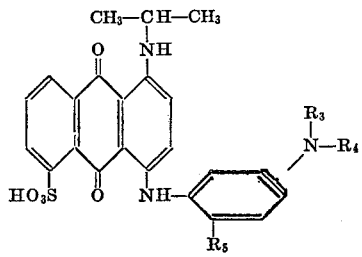

in which $R_3$ and $R_5$ represent, independently of one another, hydrogen or lower alkyl and $R_4$ stands for a lower alkyl carbonyl or a hydroxy substituted lower alkyl carbonyl group.

3. An anthraquinone dystuff having the formula

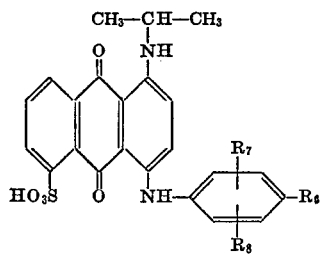

in which $R_6$ stands for hydrogen, lower alkyl or lower alkoxy, $R_7$ represents hydrogen, lower alkyl or a sulfonic acid group and $R_8$ denotes hydrogen or lower alkyl.

4. The dyestuff having the formula

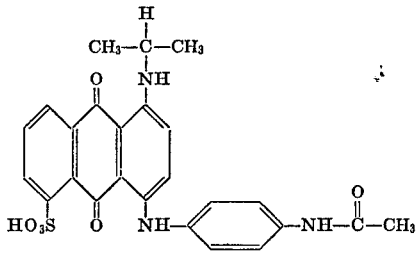

5. The dyestuff having the formula

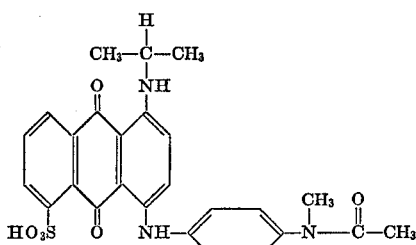

6. The dyestuff having the formula

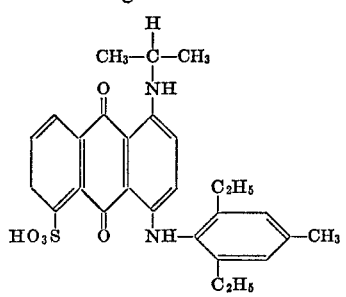

7. The dyestuff having the formula

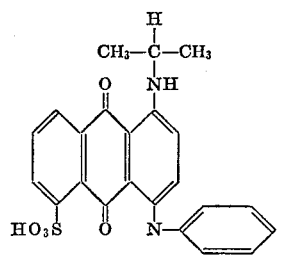

8. The dyestuff having the formula

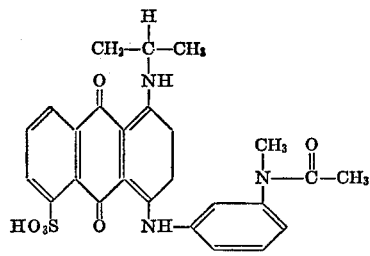

9. The dyestuff having the formula

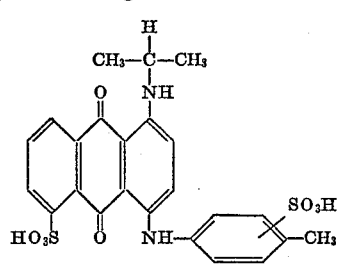

10. The dyestuff having the formula
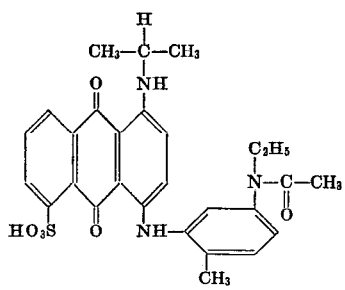
11. The dyestuff having the formula
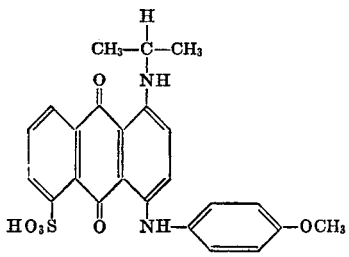
12. The dyestuff having the formula
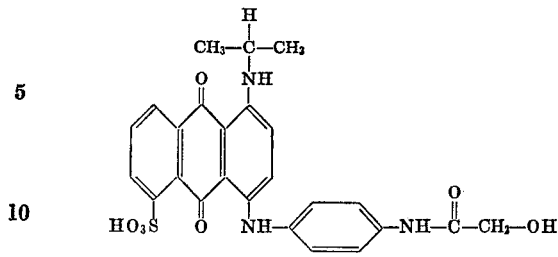
References Cited
UNITED STATES PATENTS
| | | | |
|---|---|---|---|
| 3,632,611 | 1/1972 | Kennochi et al. | 260—374 |
| 1,898,861 | 2/1933 | von Allmen | 260—374 |
| 3,462,463 | 8/1969 | Schwander | 260—374 |
| 2,685,590 | 8/1954 | Wunland | 260—372 |
FOREIGN PATENTS
| | | | |
|---|---|---|---|
| 551,881 | 3/1943 | Great Britain | 260—372 |
| 1,518,099 | 2/1968 | France. | |
LORRAINE A. WEINBERGER, Primary Examiner
E. J. SKELLY, Assistant Examiner
U.S. Cl. X.R.
8—39; 260—340.3, 326.5 S, 371, 374

UNITED STATES PATENT OFFICE
CERTIFICATE OF CORRECTION

PATENT NO. : 3,829,452
DATED : August 13, 1974
INVENTOR(S) : KLAUS WUNDERLICH ET AL.

It is certified that error appears in the above-identified patent and that said Letters Patent are hereby corrected as shown below:

| COLUMN | LINE | ERROR |
|---|---|---|
| 1 | 14 | Between "isopropylamino" and "4" delete the comma and insert a hyphen. |
| 2 | 30 | Between "methyl" and "ester" delete the comma and insert a hyphen. |
| 6 | 46 | "synthetc" should read --- synthetic ---. |
| 11 | 41 | Between "ethyl" and "N" delete the comma and insert a hyphen. |
| 11 | 43 | Between "ethyl" and "N" delete the comma and insert a hyphen. |
| 11 | 45 | Between "ethyl" and "N" delete the comma and insert a hyphen. |
| 11 | 46 | Between "methyl" and "N" delete the comma and insert a hyphen. |
| 11 | 47 | "benzylamino" should read --- benzoylamino ---. |

UNITED STATES PATENT OFFICE  Page 2
CERTIFICATE OF CORRECTION

PATENT NO. : 3,829,452
DATED : August 13, 1974
INVENTOR(S) : Klaus Wunderlich et al.

It is certified that error appears in the above-identified patent and that said Letters Patent are hereby corrected as shown below:

| COLUMN | LINE | ERROR |
|---|---|---|
| 11 | 48 | Between "cyclohexyl" and "N" delete the comma and insert a hyphen. |
| 11 | 33 in the formula | "RH" should read --- NH ---. |
| 12 | 50 in the formula | 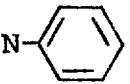 |

Signed and sealed this 24th day of June 1975.

(SEAL)
Attest:

RUTH C. MASON
Attesting Officer

C. MARSHALL DANN
Commissioner of Patents
and Trademarks